United States Patent
Laimböck (10) Patent No.: US 6,729,275 B2
(45) Date of Patent: *May 4, 2004

(54) TWO-STROKE INTERNAL COMBUSTION ENGINE WITH CRANKCASE SCAVENGING

(75) Inventor: Franz Laimböck, Thal (AT)

(73) Assignee: AVL List GmbH, Graz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 10/301,853

(22) Filed: Nov. 22, 2002

(65) Prior Publication Data

US 2003/0116107 A1 Jun. 26, 2003

Related U.S. Application Data

(63) Continuation-in-part of application No. 10/173,730, filed on Jun. 19, 2002, now Pat. No. 6,539,900, which is a continuation-in-part of application No. 09/883,202, filed on Jun. 19, 2001, now abandoned, which is a continuation-in-part of application No. 09/498,072, filed on Feb. 4, 2000, now abandoned.

(30) Foreign Application Priority Data

Feb. 5, 1999 (AT) .............................................. 72/99 U (51) Int. Cl.$^7$ ................................................ F02B 33/04
(52) U.S. Cl. .................................................. 123/73 PP
(58) Field of Search .......................... 123/73 PP, 73 A, 123/65 A, 73 C, 74 B, 65 PD (56) References Cited

U.S. PATENT DOCUMENTS

| 3,881,454 | A |   | 5/1975  | Jaulmes          |           |
|-----------|---|---|---------|------------------|-----------|
| 4,161,163 | A |   | 7/1979  | Boyesen          |           |
| 4,779,581 | A | * | 10/1988 | Maier            | 123/73 A  |
| 5,092,287 | A | * | 3/1992  | Motoyama et al.  | 123/73 A  |
| 5,092,288 | A | * | 3/1992  | Staerzl          | 123/73 A  |
| 5,144,919 | A |   | 9/1992  | Franz            |           |
| 5,443,045 | A |   | 8/1995  | Marconi          |           |
| 6,539,900 | B2| * | 4/2003  | Laimböck         | 123/73 PP |

FOREIGN PATENT DOCUMENTS

| AT | 397695   | 6/1994 |
| AT | 399913   | 8/1995 |
| DE | 19627040 | 1/1998 |

* cited by examiner

*Primary Examiner*—Tony M Argenbright
*Assistant Examiner*—Hyder Ali
(74) *Attorney, Agent, or Firm*—Dykema Gossett PLLC (57) ABSTRACT

A two-stroke internal combustion engine with crankcase scavenging includes an exhaust passage controlled by the piston and at least two first transfer passages and at least one second transfer passage, each with a corresponding transfer window into the cylinder chamber and a window on the crankcase side for communication between the cylinder chamber and the crankcase, the transfer windows of the first transfer passages being controlled by the upper edge of the piston, and the crankcase-side window of the second transfer passage being disposed in a region of the cylinder wall that is swept by the piston skirt of the piston. The cylinder wall includes at least one recess which is arranged in close vicinity to the transfer window of the second transfer passage and which is in flow communication with the second transfer passage, wherein a narrow passage is arranged between the recess and the second transfer passage.

46 Claims, 5 Drawing Sheets

TWO-STROKE INTERNAL COMBUSTION ENGINE WITH CRANKCASE SCAVENGING

CROSS-REFERENCE TO RELATED APPLICATIONS

This is a continuation-in-part of application Ser. No. 10/173,730 filed Jun. 19, 2002, now U.S. Pat. No. 6,539,900 which was a continuation-in-part of application Ser. No. 09/883,202, filed Jun. 19, 2001, now abandoned, which was a continuation-in-part of application Ser. No. 09/498,072, filed Feb. 4, 2000, now abandoned.

BACKGROUND OF THE INVENTION

The invention relates to a two-stroke internal combustion engine with crankcase scavenging, with the exhaust passage controlled by the piston and at least two first transfer passages and at least one second transfer passage, each with a transfer window into the cylinder chamber and a window on the crankcase side for communication between the cylinder chamber and the crankcase, the transfer windows of the first transfer passages being controlled by the upper edge of the piston, and the crankcase-side window of the second transfer passage being disposed in a region of the cylinder wall that is swept by the piston skirt of the piston, wherein for control of the second transfer passage the piston skirt of the piston is provided with a control opening in the area of the crankcase-side window of the second transfer passage.

DESCRIPTION OF THE PRIOR ART

The U.S. Pat. No. 3,881,454 describes a two-stroke engine construction with a pair of main scavenging passages and an auxiliary scavenging passage, in which a fuel injector is located. The piston is reciprocatable to open and close the exhaust, main and auxiliary scavenging passages, which communicate at one end with the crankcase at least as long as the auxiliary scavenging window is uncovered by the piston. As the fuel injector is arranged near the entry of the auxiliary scavenging passage into the combustion chamber the temperature of the nozzle becomes very high resulting in carbon deposits and higher wear.

In AT 399 913 B a two-stroke engine is described, where at least two of the transfer or scavenging passages open earlier than the others to obtain the desired scavenging results, i.e., at a time when the pressure in the cylinder still exceeds that in the crankcase, so that exhaust gas will flow into these passages and push back the fresh charge inside without entering the crankcase itself. The timing of these transfer passages is effected by the upper edge of the piston acting as a control edge. Fuel supply is effected via a carburetor into a feed passage connected with the crankcase.

In AT 397 695 B an internal combustion engine is described, where a fuel injector is positioned in the transfer passage, the injected fuel stream being directed towards the side of the piston top facing the cylinder chamber. The axis of the injected fuel stream forms an angle with the piston axis that is smaller than 90°, so that the fuel will mostly hit the half of the flat and rotation-symmetrical piston top opposite of the exhaust window. The drawback of this configuration is that strong scavenging losses are incurred in the lower speed range. Moreover, the time available for an injection cycle is limited by the opening period of the scavenging windows. For selection of the injector this may lead to problems with the dynamic range, i.e., the ratio of idle quantity to full-load quantity. Because of the shortness of the injection period the fuel is injected onto the piston edge and piston rings, which will have negative effects on HC emissions and cause wetting of the cylinder wall and wash off the lubrication film.

DE 196 27 040 A1 presents a two-stroke spark-ignition engine with fuel injection, where an injector is positioned in the cylinder wall next to the cylinder chamber. This arrangement and the lack of air circulation around the injector will lead to high temperatures and an increase in carbon deposits at the injector nozzle. Other undesirable results, which are caused by the direction of the injected fuel stream, will be the wetting of the cylinder wall and washing-off of the lubricating film.

Another two-stroke internal combustion engine is described in U.S. Pat. No. 5,443,045, where an injector passes through the cylinder wall into the cylinder. The injector faces the exhaust window at a downward angle, which will result in strong scavenging losses in the lower speed range. As the injector is positioned in that area of the cylinder wall that is swept during the compression stroke high temperatures and increased build-up of carbon deposits at the injector nozzle will occur due to the lack of air circulation.

SUMMARY OF THE INVENTION

It is an object of the invention to overcome these disadvantages and to propose a two-stroke internal combustion engine of the above type, where fuel losses and hydrocarbon emissions may be minimized in a simple manner for both high and low speeds and loads. Another object of the invention is to increase the service life of the injector.

According to the invention this is achieved by providing that said cylinder wall comprises at least one recess and that at least one first injector opens into said recess being arranged in close vicinity to said transfer window of said second transfer passage, wherein a narrow passage is arranged between said recess and said second transfer passage. Disposing the first injector in the recess which communicates with the second transfer passage will considerably reduce carbon deposits as the air circulation prevailing in this region will afford cooling, and will enhance carburetion. Due to the narrow passage air flowing from the second transfer passage to the recess will be accelerated and therefore improve the cooling of the orifice of the first injector.

It is provided in a preferred variant that the narrow passage is shaped by at least one groove in the cylinder wall. According to an alternative embodiment the recess may also be shaped by a duct branching off from the second transfer passage and leading to the recess. If the recess is disposed above the transfer window of the second transfer passage, i.e., on the side of a combustion chamber top, the groove may be arranged in the direction of the cylinder axis.

According to another embodiment of the invention the narrow passage is shaped by a separating edge of a cross rib, said separating edge dividing the recess from said transfer window of said second transfer passage. The distance between the separating edge and the cylinder axis is larger than the distance between the cylinder wall and the cylinder axis.

According to a further embodiment of the invention a reduction of carbon deposits can be achieved by means of a separating edge being located in at least one transfer passage between an upper and a lower edge of the second transfer window. The separating edge divides the second transfer window into an upper and lower region, wherein the separating edge is at a larger distance from the cylinder axis than the upper or lower edge. If the edge of the piston passes the separating edge, the lower region of the second transfer window will be closed. Between the separating edge and the piston there is a small gap through which the intake flow passes into the upper region, flowing around and cooling the nozzle. The separating edge is formed by a cross rib, being arranged at right angle to the cylinder axis.

The axes of the first injectors may be positioned within a wide angular range of α=20–140° relative to the cylinder axis or a parallel thereof. Moreover, the directions of the axis of the fuel stream coming from the first injector, i.e., the jet axis, and the injector axis of the first injector may differ. In this way the injection characteristics of the first injector may be adjusted to the respective requirements.

It is provided in a preferred variant of the invention that at least two second transfer passages be disposed on the side of the exhaust passage and, preferably, that the first injector opening into at least one recess or one second transfer passage faces the half of the cylinder chamber opposite of the exhaust passage. In this manner scavenging losses may be kept exceedingly small.

In another variant of the invention the proposal is put forward that at least one second transfer passage be disposed on the side of the cylinder opposite of the exhaust passage. The second transfer passage may be positioned in a symmetry plane containing the axis of the exhaust passage and the cylinder axis.

To keep scavenging losses as small as possible it could also be provided that at least two second transfer passages be positioned outside of a symmetry plane containing the exhaust passage axis and the cylinder axis. In this context the jet axis of the first injector—seen in the direction towards the cylinder axis—should preferably be directed onto a transfer window of a transfer passage that is preferably diametrically opposed.

In order to prevent the cylinder wall from being wetted by the fuel it may be provided that the jet axis of the first injector—seen in the direction towards the cylinder axis—be directed onto the exhaust window of the exhaust passage.

To enable the first and second transfer passages to be timed independently of each other, and to permit optimum fuel injection into the cylinder chamber it may be provided that the upper edge of the transfer window of the second transfer passage be at a smaller distance from the top of the combustion chamber than the upper edge of the transfer window of the first transfer passage. This configuration is especially suitable for use with rotation-symmetrical, flat piston tops.

In the instance of an internal combustion engine with several first injectors per cylinder it may be provided by the invention that the injection axes of the injectors disposed in second transfer passages have different angles relative to each other and/or to the cylinder axis or a parallel of the cylinder axis. In this way first injectors with different injection characteristics may be used, permitting carburetion to be adjusted to any operating state of the engine. One first injector could be configured as full-load injector and another one as part-load injector, for example.

For optimum adjustment of the injection process to the respective requirements it may be provided in further development of the invention that the first injector be configured as a multi-jet unit, with at least two fuel jets differing as regards fuel amounts and/or injection times, preferably.

Designing the internal combustion engine as proposed by the invention will ensure that the transfer windows of the first and second transfer passages and the crankcase-side window of the at least one second transfer passage and the corresponding control opening are disposed such that the first and second transfer passages will be timed in different stroke positions of the piston. Obviously, the transfer passages could also be arranged so that the first and second transfer passages are controlled roughly simultaneously though by means of different control edges.

According to a further embodiment of the invention there is further provided at least one second injector opening into a crankcase chamber. The second injector may also open into an inlet duct, wherein the second injector can be arranged downstream of a reed-valve or upstream of the reed-valve and downstream of a throttle valve. At low and middle load as well as at low and middle speed fuel is injected via the first injector. At high or full load and at high or full speed fuel is injected at least by means of the second injector.

DESCRIPTION OF THE DRAWINGS

Following is a more detailed description of the invention as illustrated by the accompanying drawing, in which.

DETAILED DESCRIPTION OF PREFERRED EMBODIMENTS

Figures 1, 2, 3, 4:
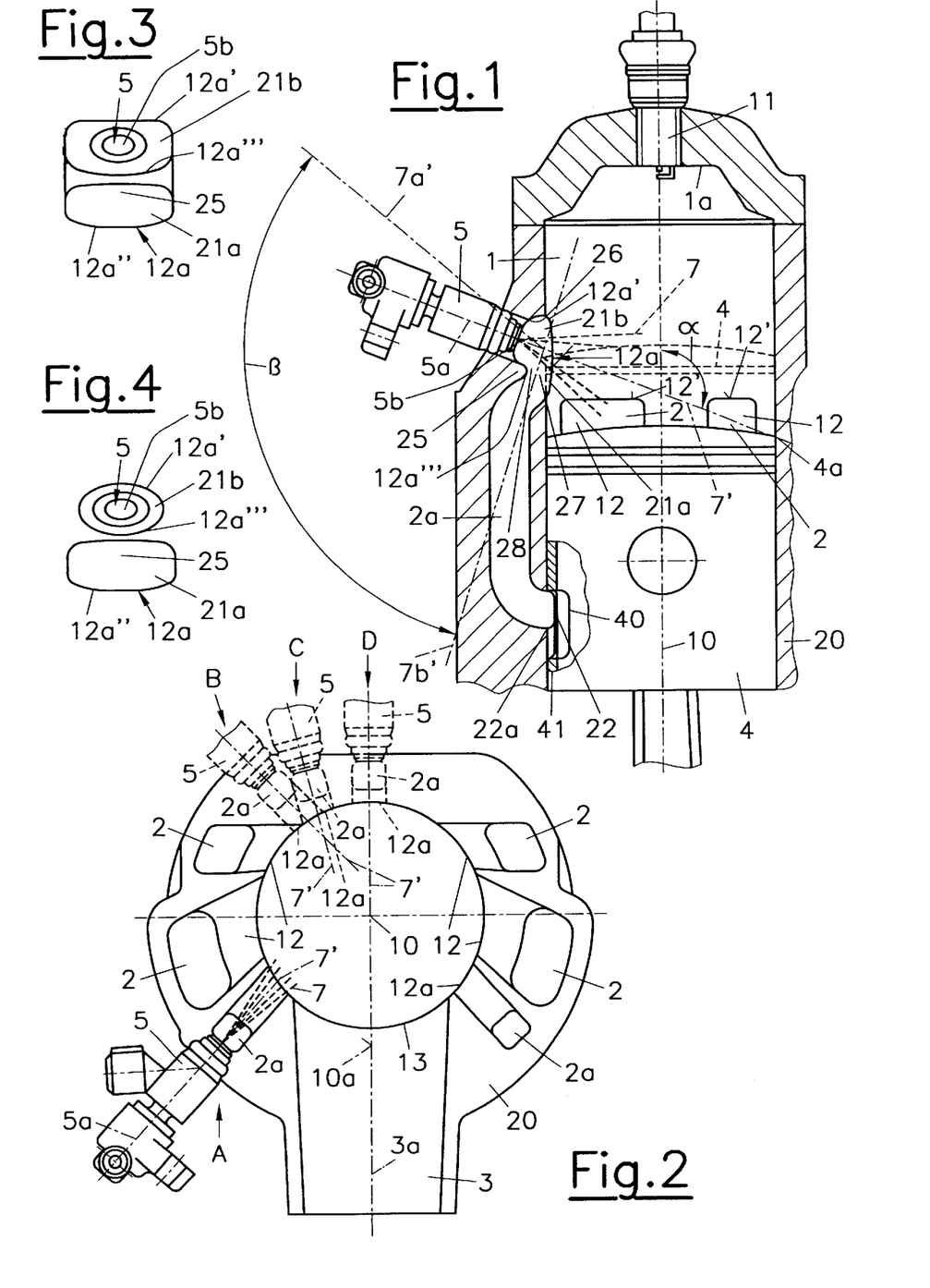
FIG. 1 is a schematic representation of a two-stroke internal combustion engine according to a first embodiment of the invention, in longitudinal section.
FIG. 2 represents this engine in plan view, seen in the direction of the cylinder axis.
FIG. 3 is a detail view of the second transfer window according to said first embodiment.
FIG. 4 is a detail view of the second transfer window in a second embodiment of the invention.

FIG. 1 shows a two-stroke internal combustion engine according to the invention in axial view, where several first transfer passages 2 along the periphery of the cylinder wall 1*b* and at least one second transfer passage 2*a* open into the cylinder chamber 1, forming transfer windows 12, 12*a*, which are complemented by an exhaust passage 3 with an exhaust window 13. The cylinder casing is referred to as 20, whilst 11 denotes an ignition source in the combustion chamber top 1*a*.

The upper edge 12*a*' of the second transfer window 12*a* is at a smaller distance from the combustion chamber top 1*a* than the upper edges 12' of the first transfer windows 12. On the crankcase side the second transfer passage 2*a* opens into the cylinder wall 1b, the crankcase-side window bearing reference numeral 22. Control of the second transfer passage 2a is effected via a control opening 40 in the piston skirt 41 of the piston 4.

According to a first embodiment of the invention shown in FIGS. 1 to 3 in the second transfer passage 2a a first injector 5 is disposed, whose fuel stream or injection jet 7 passes through the transfer window 12a into the cylinder chamber 1. The jet axis 7' of the injection jet 7 of the first injector 5 has an angle a of 20° to 140° relative to the cylinder axis 10 or a parallel of the cylinder axis 10. Due to the position of the second transfer passage 2a there is considerable liberty in choosing the direction of the first injector 5 within the range indicated in FIG. 1 by the angle β. The extreme positions of the jet axis are denoted by 7a' and 7b'.

By arranging the transfer window 12a of the second transfer passage 2a above the transfer windows 12 of the first transfer passages 2, and as control of the second transfer passage 2a is effected not by the upper edge 4a of the piston 4 but via a separate control opening 22 whose control edges are referred to as 22a, the timing of the first and second transfer passages 2, 2a and fuel injection via the first injector 5 may be decoupled, and intake flow and injection characteristics may be adjusted to the respective requirements. As a consequence, HC emissions and fuel consumption may be kept extremely low under both part-load and full-load conditions. By disposing the first injector 5 in the second transfer passage 2a the injector nozzles 5b are well protected against the build-up of carbon deposits. The direction of the injected fuel stream is chosen so as to prevent the fuel from wetting the cylinder wall.

Between an upper edge 12a' and a lower edge 12a" of the second transfer window 12a separating edge 12a''' is arranged in the second transfer passage 2a dividing the second transfer window 12a into a lower region 21a and an upper region 21b. The separating edge 12a''' being formed by a cross rib 25 is arranged at right angle to the cylinder axis 10 as illustrated in FIGS. 1 and 3.

The separating edge 12a''' is at a larger distance from the cylinder axis 10 than the upper edge 12a' and the lower edge 12a" and forms a narrow passage 28 between upper region 21b and lower region 21a of the second transfer passage 2a. If the upper edge 4a of the piston 4 gets to a position near to the separating edge 12a''' the lower region 21a of the second transfer window 12a is almost closed except a small gap 27 between the separating edge 12''' and the piston 4 when the piston 4 is taking a position which is indicated in FIG. 1 with broken lines. The gap 27 forms the narrow passage 28 and causes an acceleration of the passing intake flow, Intake flow of the second transfer passage 2a passing the gap 27 gushes to the upper region 21b and cools the nozzle 5b of the first injector 5. Therefore overheating of the nozzle 5b of the injector 5 can be avoided. The cross section of the upper region 21b may be smaller than the cross section of the lower region 21a.

Alternatively or further to the cross rib 25 the first injector 5 may be disposed in a recess 26 of the upper region 21b of the second transfer passage 2a. FIG. 4 shows such a second embodiment of the invention with an first injector 5 opening into a recess 26.

FIG. 2 gives a plan view of the internal combustion engine with possible configurations for the second transfer passage 2a and the first injector 5. A denotes a first configuration, in which the second transfer passage 2a is located next to the exhaust passage 3, and the jet axis 7' of the fuel jet 7 injected by the first injector 5 runs in the direction of the transfer window 12a of a first transfer passage 2 that is diametrically opposed to the first injector 5. The direction of the jet axis 7' may differ from that of the injector axis 5' and be inclined thereto at an angle of up to 30°, approximately. B indicates a second configuration for a second transfer passage 2a, in which the jet axis 7' of the first injector 5 not shown here in detail runs towards the transfer window 12a of a second transfer passage 2a disposed laterally. The transfer window 12a is essentially positioned opposite the exhaust window 13. Configuration C differs from configuration B in that the jet axis 7' of the first injector 5 points towards the exhaust window 13.

The common feature of variants A, B and C is that the second transfer passage 2a does not lie in a symmetry plane 10a going through the cylinder axis 10 and axis 3a of the exhaust passage 3.

In a fourth configuration denoted D the second transfer passage 2a including the first injector 5 is disposed in the symmetry plane 10a. By suitable choice of the inclination angle a between the jet axis 7' of the injector 5 and the cylinder axis 10 or a parallel thereto scavenging losses may be avoided. It should be understood that a combination of variants A, B, C, D is possible, where several first injectors 5 with different injection characteristics may be provided.

It is further possible to configure the first injector 5 as a multi-jet unit, for example, a two-jet injector, where the injected fuel amounts as well as beginning and/or end of injection of the individual fuel streams may differ.

Figure 5:
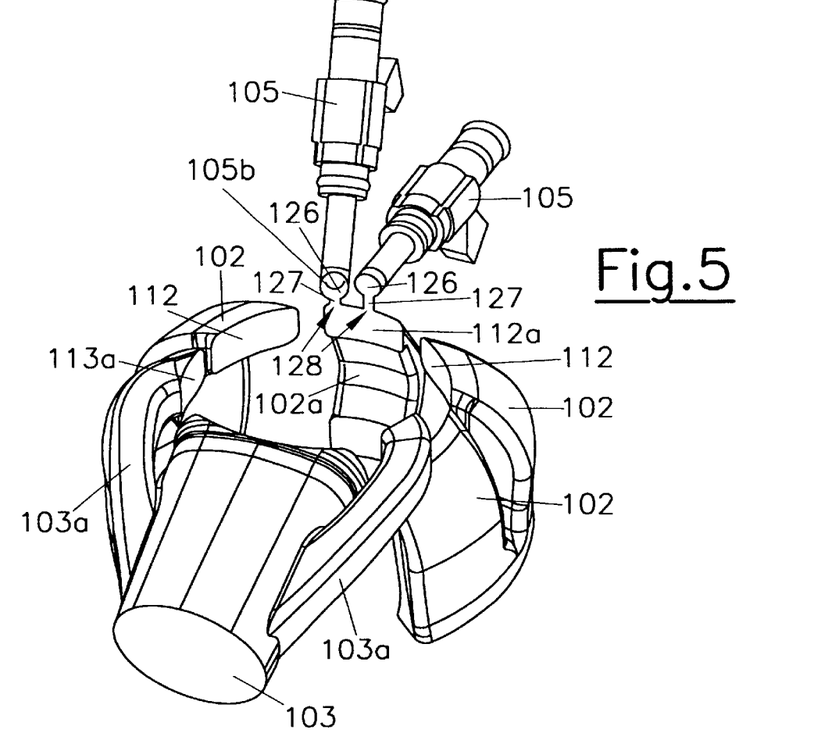
FIG. 5 is an oblique view of transfers passages in a third embodiment of the invention, seen in the direction of the second transfer passage.
Figure 6:
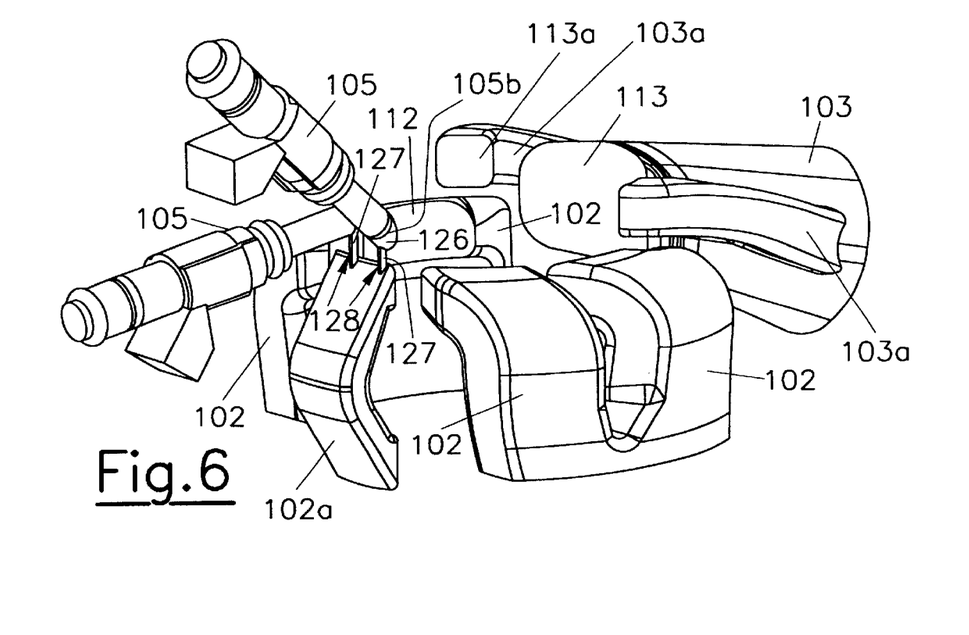
FIG. 6 is an oblique view of transfer passages in said third embodiment, seen in the direction of the exhaust passage.
Figure 7:
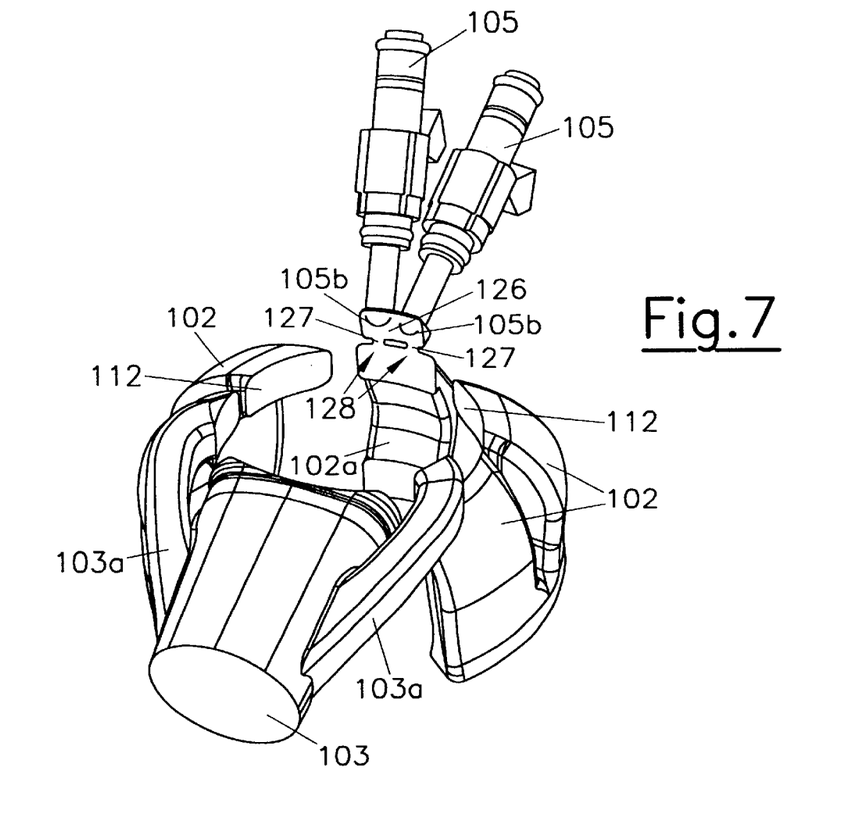
FIG. 7 is an oblique view of transfer passages in a fourth embodiment of the invention, seen in the direction of the second transfer passage.
Figure 8:
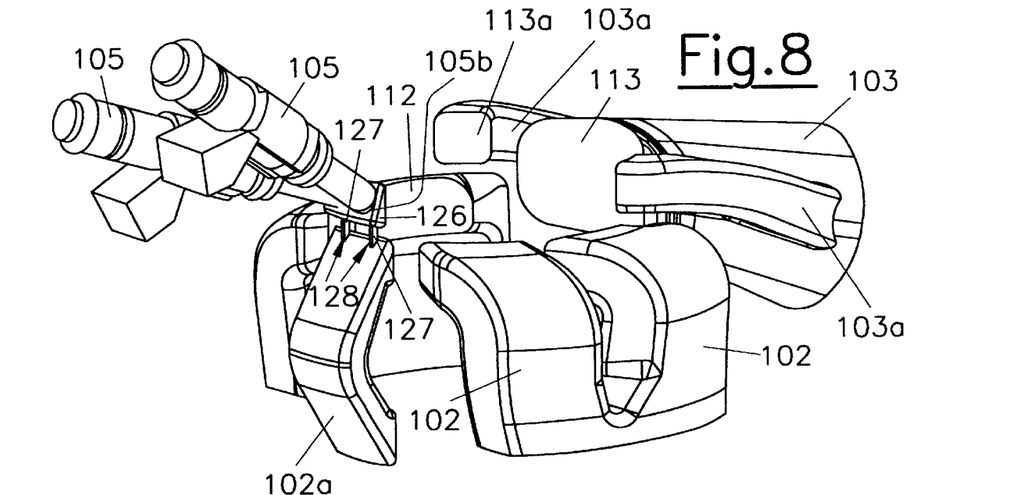
FIG. 8 is an oblique view of transfer passages in said fourth embodiment, seen in the direction of the second transfer passage.

FIGS. 5 and 6 show first transfer passages 102, second transfer passages 102a, exhaust passages 103 and auxiliary exhaust passages 103a of a two-stroke internal combustion engine according to a third embodiment of the invention. Similar to said third embodiment FIGS. 7 and 8 give oblique views of a fourth embodiment of the invention, For reasons of clearity cylinder, piston, ignition source and cylinder casing are not shown in FIGS. 5 to 8.

Similar to the first and second embodiment shown in FIGS. 1 to 4 the first and second transfer passages 102, 102a open into the cylinder chamber (not shown in FIGS. 5 and 6), forming transfer windows 112, 112a, which are complemented by the exhaust passage 103 and auxiliary exhaust passages 103a with exhaust windows 113, 113a.

Unlike the first and second embodiment in the third and fourth embodiment at least one first injector 105 opens into a recess 126 which is formed in the cylinder wall. The recess 126 is in flow communication with the second transfer passage 102a via a narrow passage 128, which is shaped by at least one groove 127 formed in the cylinder wall. If the piston gets to a position near the groove 127, the second transfer passage 102a and the recess 126 are separated with the exception of the groove 127. Intake flow of the second transfer passage 102a passing the groove 127 gushes to the recess 126 with high speed and cools the nozzle 105b of the first injector 105.

In the third embodiment shown in FIGS. 5 and 6 there is one recess 126, one groove 127 per first injector 105. In contrast to this in the fourth embodiment shown in FIGS. 7 and 8 both first injectors 105 open into the same recess 126. Piston, exhaust passages and ignition source are not shown in FIGS. 9 and 10.

Figure 9:
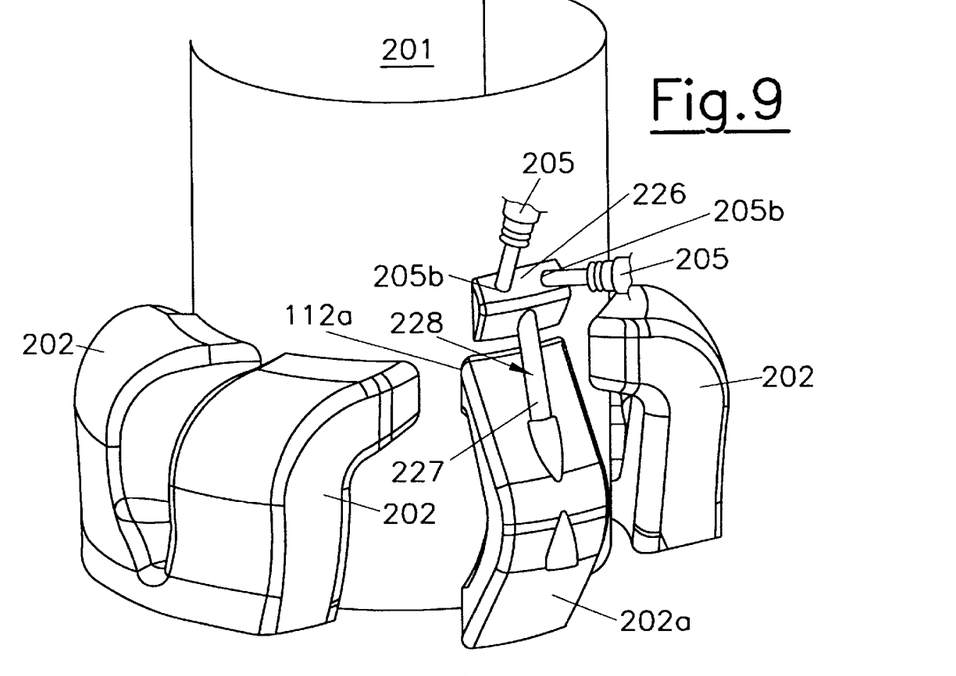
FIG. 9 is an oblique view of transfer passages in a fifth embodiment of the invention.
Figure 10:
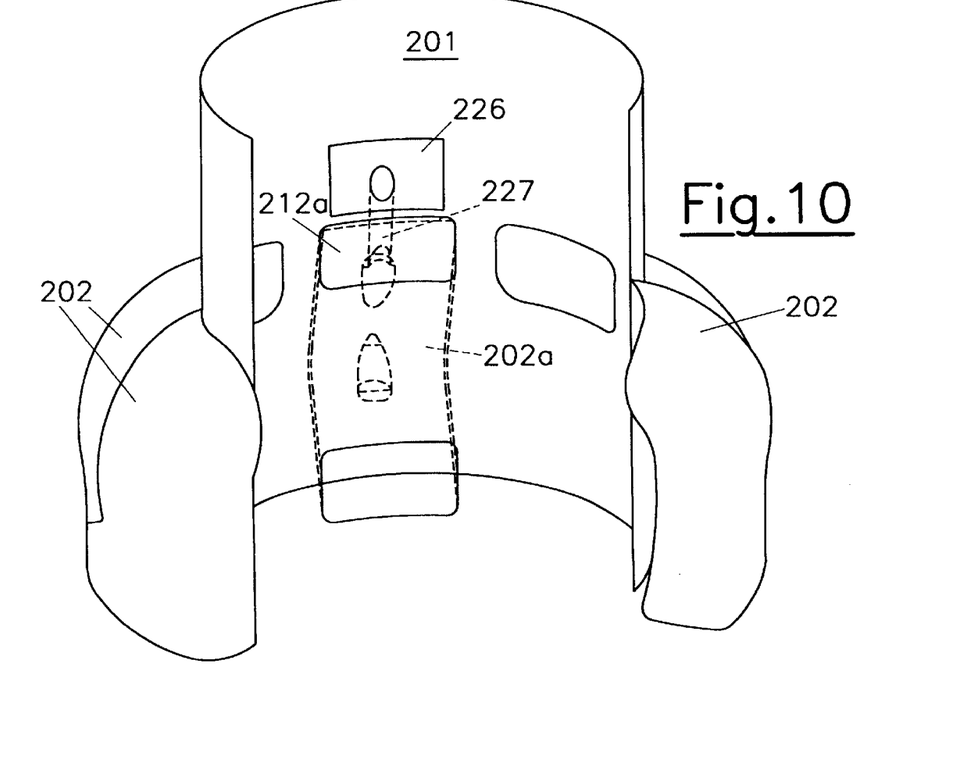
FIG. 10 is another oblique view of transfer passages in said fifth embodiment and FIG. 11 is a schematic representation of a two-stroke internal combustion engine according to a sixth embodiment of the invention, in longitudinal section.

FIGS. 9 and 10 show first transfer passages 202, second transfer passages 202a and cylinder chamber 201 of a two-stroke combustion engine according to a fifth embodiment of the invention. The narrow passage 228 is shaped by a duct 227, which branches off from the second transfer passage 202a and leads to the recess 226. If the piston gets to a piston covering the transfer window 212a of the second transfer passage 202a, the second transfer passage 202a and the recess 226 are separated with the exception of the duct 227. Intake flow of the second transfer passage 202a passing the duct 227 gushes to the recess 226 with high speed and cools the nozzles 205b of the first injector 205.

Figure 11:
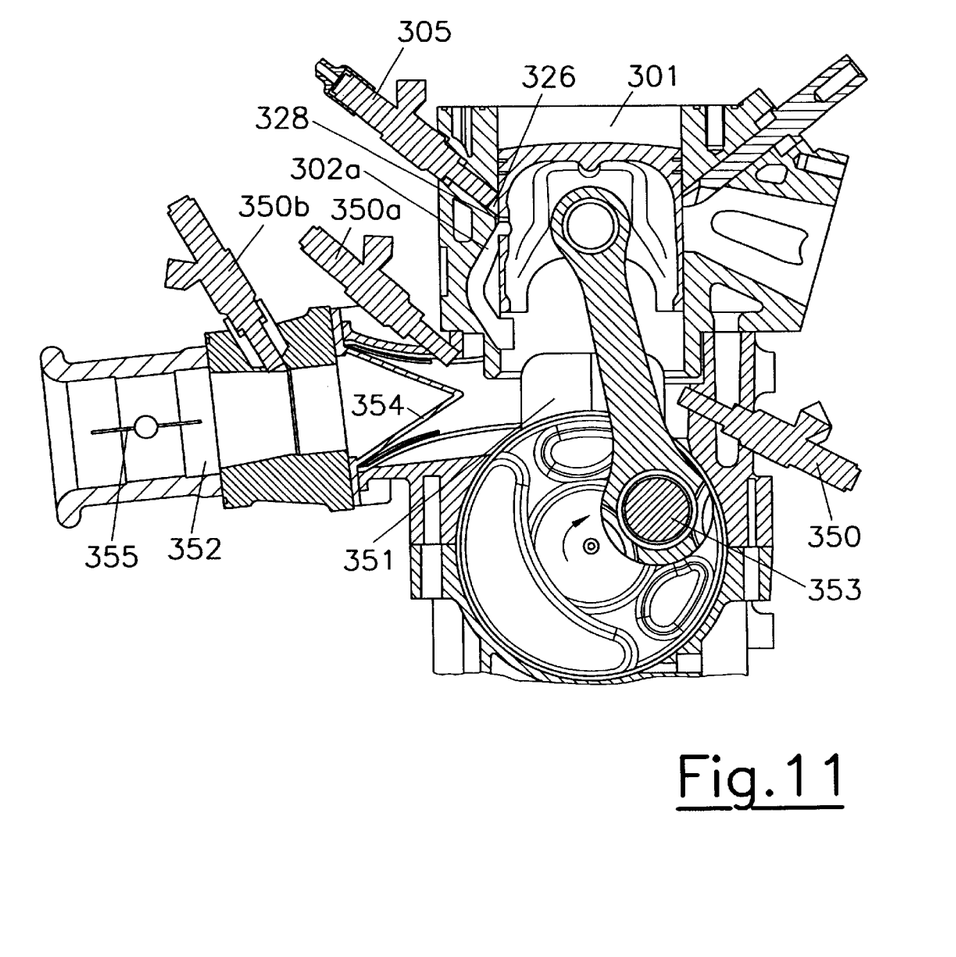

FIG. 11 shows a two-stroke internal combustion engine according to a sixth embodiment of the invention. By means of at least one first injector 305 fuel is injected at low and middle load operation into the cylinder chamber 301. The first injector 305 opens into a recess 326 in the cylinder wall, which is in flow communication with a second transfer passage 302a via a narrow passage 328. In order to improve processing and homogenisation of the fuel-air mixture and to increase power and efficiency in the fuel load region of the combustion engine at least one second injector 350, 350a, 350b is provided and opens into the crankcase chamber 351 or into an inlet duct 352 leading into the crankcase chamber 351, Reference 350 shows a second injector 350 opening into the crankcase chamber in such a way that fuel may be injected against the rotation of the crankshaft 353 enabling an adequate atomisation of the fuel. Alternatively or in addition to this the second injector 350a, 350b may be arranged in the inlet duct 352 which leads to the crankcase chamber 351, either downstream of a reed-valve 354 or upstream of a reed-valve 354 and downstream of a throttle valve 355, wherein fuel is injected in the direction of rotation of the crankshaft 353.

What is claimed is:

1. A two-stroke internal combustion engine with crankcase scavenging, with an exhaust passage controlled by a piston and at least two first transfer passages and at least one second transfer passage, each with a transfer window into a cylinder chamber and a crankcase-side window for communication between the cylinder chamber and a crankcase, the transfer windows of the first transfer passages being controlled by the upper edge of the piston, and the crankcase-side window of the second transfer passage being disposed in a region of a cylinder wall that is swept by a piston skirt of the piston, wherein for control of the second transfer passage the piston skirt of the piston is provided with a control opening in the area of the crankcase-side window of the second transfer passage, wherein said cylinder wall comprises at least one recess, wherein at least one first injector opens into said recess arranged in close vicinity to said transfer window of said second transfer passage, and wherein a narrow passage is arranged between said recess and said second transfer passage.

2. The two-stroke internal combustion engine according to claim 1, wherein the narrow passage is shaped by at least one groove in the cylinder wall between said recess and said transfer window of said second transfer passage.

3. The two-stroke internal combustion engine according to claim 1, wherein the narrow passage is configured as a gap, which is shaped by a separating edge dividing the recess from said transfer window of said second transfer passage.

4. The two-stroke internal combustion engine according to claim 3, wherein the distance between separating edge and cylinder axis is larger than the distance between cylinder wall and cylinder axis.

5. The two-stroke internal combustion engine according to claim 3, wherein the separating edge is arranged at right angle to the cylinder axis.

6. The two-stroke internal combustion engine according to claim 1, wherein the recess is disposed above the transfer window of the second transfer passage on the side of a combustion chamber top.

7. The two-stroke internal combustion engine according to claim 1, wherein at least two first injectors open into one recess.

8. The two-stroke internal combustion engine according to claim 1, wherein the narrow passage is shaped by at least one duct being formed in a cylinder casing.

9. The two-stroke internal combustion engine according to claim 1, wherein a jet axis of the fuel injector forms an angle of 20° to 140° with a cylinder axis.

10. The two-stroke internal combustion engine according to claim 1, wherein the directions of the jet axis and the injector axis of the first injector differ.

11. The two-stroke internal combustion engine according to claim 1, wherein at least two second transfer passages are disposed on the side of the exhaust passage.

12. An two-stroke internal combustion engine according to claim 1, wherein the first injector opening into at least one recess faces a half of the cylinder chamber opposite the exhaust passage.

13. The two-stroke internal combustion engine according to claim 1, wherein at least one second transfer passage is disposed on the side of the cylinder opposite the exhaust passage.

14. The two-stroke internal combustion engine according to claim 1, wherein the second transfer passage is positioned in a symmetry plane containing an exhaust passage axis and the cylinder axis.

15. The two-stroke internal combustion engine according to claim 1, wherein at least two second transfer passages are positioned outside of the symmetry plane containing the exhaust passage axis and the cylinder axis.

16. The two-stroke internal combustion engine according to claim 1, wherein the jet axis of the first injector—seen in the direction towards the cylinder axis—is directed onto an exhaust window of the exhaust passage.

17. The two-stroke internal combustion engine according to claim 1, wherein the jet axis of the first injector—seen in the direction towards the cylinder axis—is directed onto a diametrically opposed transfer window of a transfer passage.

18. The two-stroke internal combustion engine according to claim 1, wherein an upper edge of the transfer window of the second transfer passage is at a smaller distance from a combustion chamber top than the upper edge of the transfer window of the first transfer passage.

19. The two-stroke internal combustion engine according to claim 1 with several first injectors per cylinder, wherein the injection axes of the first injectors disposed in second transfer passages have different angles relative to each other.

20. The two-stroke internal combustion engine according to claim 1 with several first injectors per cylinder, wherein the first injectors have different injection characteristics, at least one first injector being configured as a full-load injector and at least one other first injector as part-load injector.

21. The two-stroke internal combustion engine according to claim 1, wherein the transfer windows of the first and second transfer passages and a crankcase-side window of the at least one second transfer passage and the corresponding control opening are disposed such that the first and second transfer passages will be timed in different stroke positions of the piston.

22. The two-stroke internal combustion engine according to claim 1, wherein the first injector is configured as a multi-jet unit.

23. The two-stroke internal combustion engine according to claim 1, wherein the first injector is configured as a multi-jet unit with at least two fuel jets differing as regards fuel amounts and injection times.

24. The two-stroke internal combustion engine according to claim 1, wherein at least one second injector opens into a crankcase chamber.

25. The two-stroke internal combustion engine according to claim 1, wherein at least one second injector opens into an inlet duct leading to the crankcase chamber.

26. The two-stroke internal combustion engine according to claim 25, wherein the second injector is arranged downstream of a throttle valve and upstream of a reed-valve.

27. A two-stroke internal combustion engine with crankcase scavenging, with an exhaust passage controlled by a piston and at least two first transfer passages and at least one second transfer passage, each with a transfer window into a cylinder chamber and a crankcase-side window for communication between the cylinder chamber and a crankcase, the transfer windows of the first transfer passages being controlled by the upper edge of the piston, and the crankcase-side window of the second transfer passage being disposed in a region of a cylinder wall that is swept by a piston skirt of the piston, wherein for control of the second transfer passage the piston skirt of the piston is provided with a control opening in the area of the crankcase-side window of the second transfer passage, wherein a separating edge is located in at least one second transfer passage between an upper and a lower edge of said second transfer window, said separating edge dividing the second transfer window into an upper and a lower region, the distance between separating edge and cylinder axis being larger than the distance between upper edge and the cylinder axis, and wherein at least one first injector opens into the upper region of at least one second transfer passage, wherein the separating edge is shaped by a cross rib, and wherein the separating edge is arranged at right angle to the cylinder axis.

28. The two-stroke internal combustion engine according to claim 27, wherein a jet axis of the first injector forms an angle of 20° to 140° with a cylinder axis.

29. The two-stroke internal combustion engine according to claim 27, wherein the directions of the jet axis and the injector axis of the first injector differ.

30. The two-stroke internal combustion engine according to claim 27, wherein at least two second transfer passages are disposed on the side of the exhaust passage.

31. An two-stroke internal combustion engine according to claim 27, wherein the first injector opening into at least one second transfer passage faces a half of the cylinder chamber opposite the exhaust passage.

32. The two-stroke internal combustion engine according to claim 27, wherein at least one second transfer passage is disposed on the side of the cylinder opposite of the exhaust passage.

33. The two-stroke internal combustion engine according to claim 27, wherein the second transfer passage is positioned in a symmetry plane containing an exhaust passage axis and the cylinder axis.

34. The two-stroke internal combustion engine according to claim 27, wherein at least two second transfer passages are positioned outside of the symmetry plane containing the exhaust passage axis and the cylinder axis.

35. The two-stroke internal combustion engine according to claim 27, wherein the jet axis of the first injector—seen in the direction towards the cylinder axis—is directed onto an exhaust window of the exhaust passage.

36. The two-stroke internal combustion engine according to claim 27, wherein the jet axis of the first injector—seen in the direction towards the cylinder axis—is directed onto a diametrically opposed transfer window of a transfer passage.

37. The two-stroke interns! combustion engine according to claim 27, wherein an upper edge of the transfer window of the second transfer passage is at a smaller distance from a combustion chamber top than the upper edge of the transfer window of the first transfer passage.

38. The two-stroke internal combustion engine according to claim 27 with several injectors per cylinder, wherein the injection axes of the first injectors disposed in second transfer passages have different angles relative to each other.

39. The two-stroke internal combustion engine according to claim 27 with several injectors per cylinder, wherein the first injectors have different injection characteristics, at least one first injector being configured as a fullload injector and at least one other first injector as part-load injector.

40. The two-stroke internal combustion engine according to claim 27, wherein the transfer windows of the first and second transfer passages and a crankcase-side window of the at least one second transfer passage and the corresponding control opening are disposed such that the first and second transfer passages will be timed in different stroke positions of the piston.

41. The two-stroke internal combustion engine according to claim 27, wherein the first injector is configured as a multi-jet unit.

42. The two-stroke internal combustion engine according to claim 27, wherein the first injector is configured as a multi-jet unit with at least two fuel jets differing as regards fuel amounts and injection times.

43. The two-stroke internal combustion engine according to claim 27, wherein at least one second injector opens into a crankcase chamber.

44. The two-stroke internal combustion engine according to claim 27, wherein at least one second injector opens into an inlet duct leading to the crankcase chamber.

45. The two-stroke internal combustion engine according to claim 44, wherein the second injector is arranged downstream of a throttle valve and upstream of a reed-valve.

46. The two-stroke internal combustion engine according to claim 44, wherein the second injector is arranged downstream of the reed-valve.

* * * * *